(12) United States Patent
Iwasaki

(10) Patent No.: US 12,041,212 B1
(45) Date of Patent: Jul. 16, 2024

(54) IMAGE FORMING APPARATUS AND COMMUNICATION METHOD FOR TRANSMISSION OF DATA THROUGH RELAY

(71) Applicant: Toshiba Tec Kabushiki Kaisha, Tokyo (JP)

(72) Inventor: Takao Iwasaki, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/189,976

(22) Filed: Mar. 24, 2023

(51) Int. Cl.
*H04N 1/32* (2006.01)
*H04N 1/00* (2006.01)

(52) U.S. Cl.
CPC ..... *H04N 1/32406* (2013.01); *H04N 1/00978* (2013.01); *H04N 1/00992* (2013.01)

(58) Field of Classification Search
None
See application file for complete search history.

(56) References Cited

U.S. PATENT DOCUMENTS

| 10,303,138 B2 | 5/2019 | Sekine et al. |
| 2004/0085582 A1* | 5/2004 | Yamaguchi .......... G06K 15/021 358/1.18 |
| 2005/0200886 A1* | 9/2005 | Watanabe ................. B41J 3/51 358/448 |
| 2018/0278781 A1 | 9/2018 | Honda et al. |

* cited by examiner

*Primary Examiner* — Lennin R RodriguezGonzalez
(74) *Attorney, Agent, or Firm* — FOLEY & LARDNER LLP

(57) ABSTRACT

An image forming apparatus can include a communications circuit, a printer, and a controller. The communications circuit is configured to communicate with a networked image forming apparatus via a network. The printer is configured to form an image on a sheet. The controller includes a processor and a memory. The controller is configured to acquire sensor data from a sensor operatively coupled to the controller; determine, via the network, a relay image forming apparatus, the relay image forming apparatus having an operating rate being relatively lower than an operating rate of multiple image forming apparatuses including the image forming apparatus and the networked image forming apparatus; and transmit, via the relay image forming apparatus, the sensor data to a predetermined recipient apparatus.

16 Claims, 4 Drawing Sheets

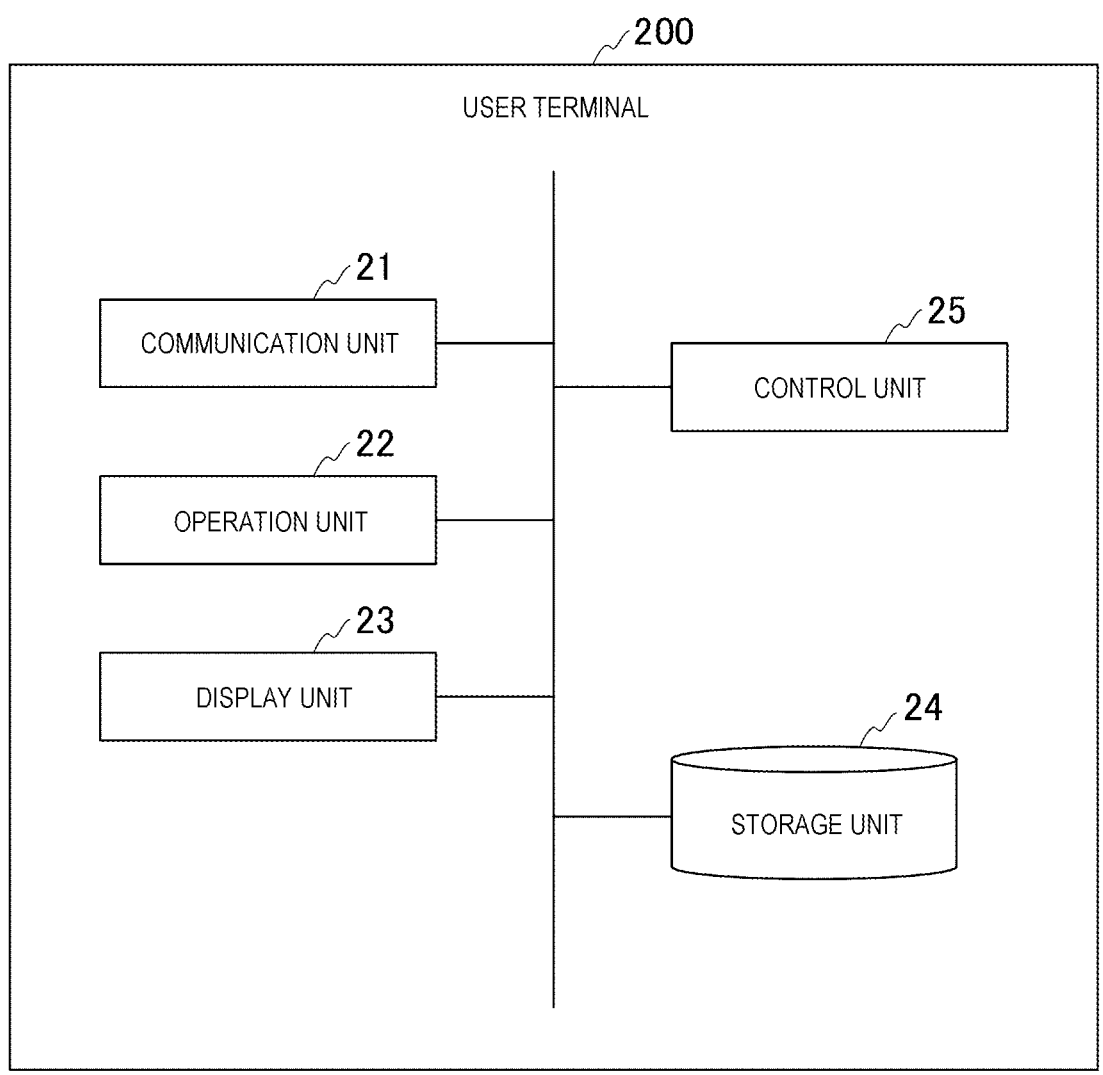

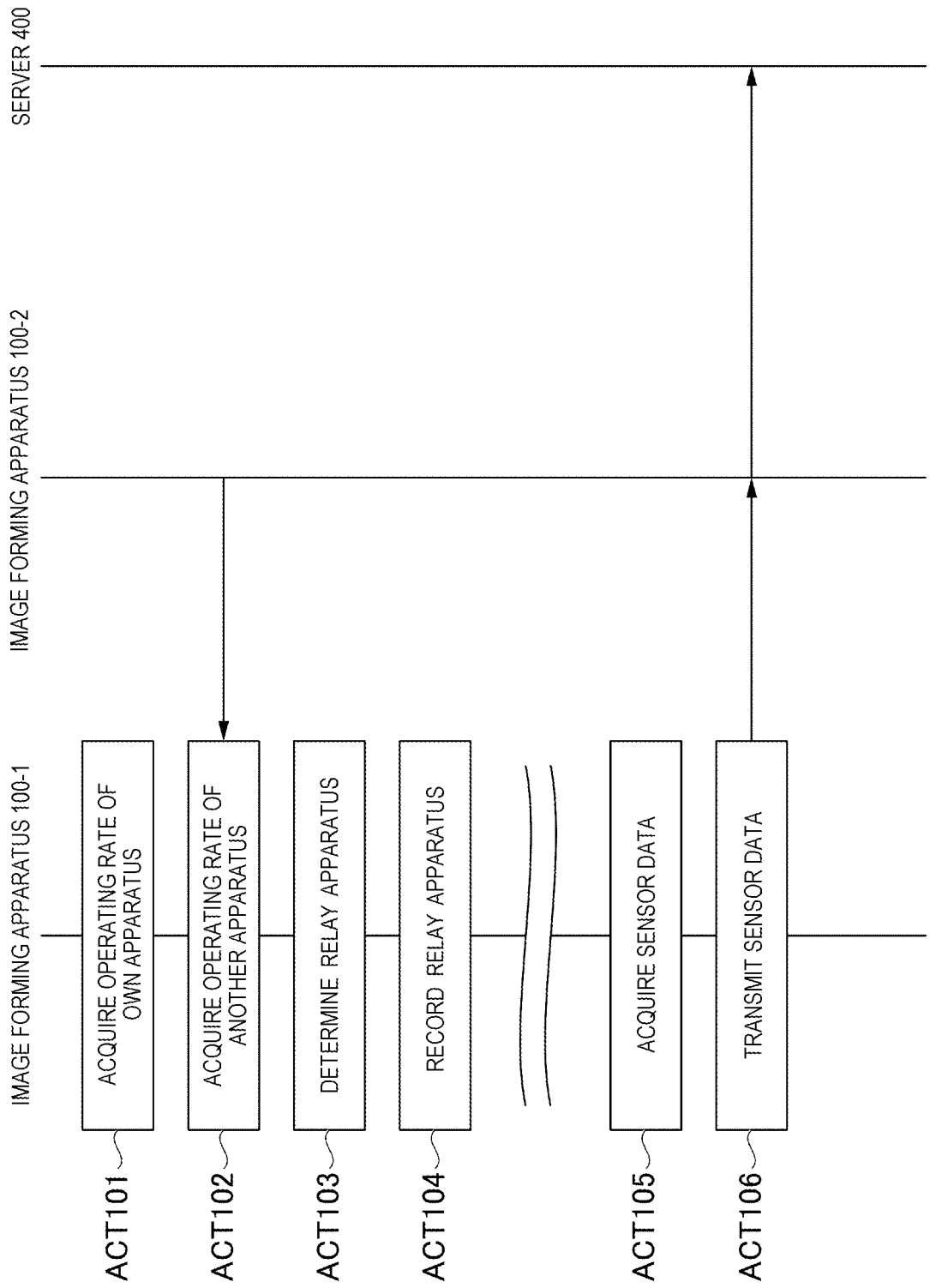

IMAGE FORMING APPARATUS AND COMMUNICATION METHOD FOR TRANSMISSION OF DATA THROUGH RELAY

FIELD

Embodiments described herein relate generally to an image forming apparatus and a communication method in a system.

BACKGROUND

An image forming apparatus such as a multifunction peripheral (MFP) directly transmits data to an external server or the like when transmitting the data to the server. At this time, when the data cannot be directly transmitted to the server due to a failure of the MFP, a technique of transmitting the data to the server via another MFP may be used. However, transmission of the data to the server via the other MFP is limited to cases where the MFP cannot transmit data to the server, such as when the MFP is powered off.

DESCRIPTION OF THE DRAWINGS

FIG. 3 is a schematic block diagram of a functional configuration of a user terminal, according to some embodiments; and FIG. 4 is a sequence chart illustrating acts of the image forming system of FIG. 1, according to some embodiments.

DETAILED DESCRIPTION

Embodiments provide an image forming apparatus and a communication method in a system, which are capable of leveling a load of a multifunction peripheral.

An image forming apparatus according to an embodiment includes a communication device, a printer, and a control unit. The communication device communicates with another image forming apparatus. The printer forms an image on a sheet. The control unit acquires data from a sensor, determines, as a relay apparatus, an image forming apparatus having a relatively low operating rate in a set including the own apparatus and the other image forming apparatus, and transmits the data to a predetermined external apparatus via the relay apparatus.

An image forming apparatus can include a communications circuit, a printer, and a controller. The communications circuit is configured to communicate with a networked image forming apparatus via a network. The printer is configured to form an image on a sheet. The controller includes a processor and a memory. The controller is configured to acquire sensor data from a sensor operatively coupled to the controller; determine, via the network, a relay image forming apparatus, the relay image forming apparatus having an operating rate being relatively lower than an operating rate of multiple image forming apparatuses including the image forming apparatus and the networked image forming apparatus; and transmit, via the relay image forming apparatus, the sensor data to a predetermined recipient apparatus.

Figure 1:
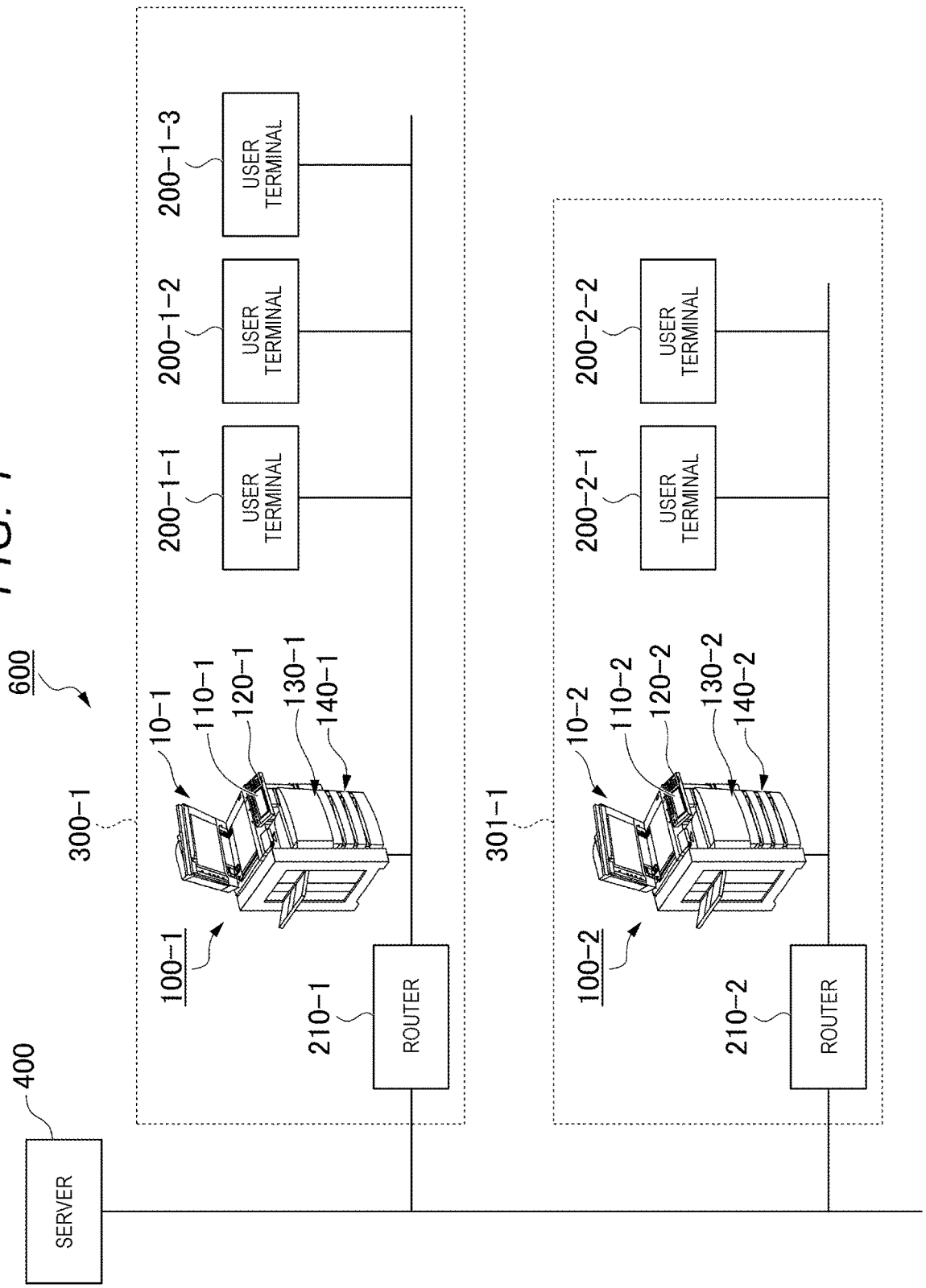
FIG. 1 is a diagram illustrating a configuration example of an image forming system, according to some embodiments.

Herein, an image forming apparatus and a communication method in a system is described with reference to the drawings. FIG. 1 is a diagram illustrating a configuration example of an image forming system 600 according to some embodiments. The image forming system 600 includes a plurality of image forming apparatuses 100, user terminals 200 (e.g., user interfaces, access points, etc.), routers 210 (e.g., multilayer switches, wireless router, modem router, etc.), and a server 400 (e.g., on-demand computing resource, network computer resource, service provider, etc.). The image forming apparatuses 100 and the server 400 are communicably connected to each other. For example, an image forming apparatus 100-1 can transmit data to an image forming apparatus 100-2 or the server 400. The image forming apparatuses 100 and the server 400 may be connected via a network 300, and the network 300 may be implemented using the Internet or a mobile communication network.

In some embodiments, the image forming apparatus 100 is connected to one or more user terminals 200 and the router 210, and constitutes an image forming apparatus network 300. The image forming apparatus network 300 is implemented for each area where the image forming apparatus 100 and the user terminal 200 are located, for example. The user terminal 200 is used when operating the image forming apparatus 100. The image forming apparatus 100 and the user terminal 200 are communicably connected to each other via wired communication or wireless communication.

The router 210 has information on the image forming apparatus network 300 (subnet information). The router 210 has data on, for example, the number of connections to an S SID assigned to the router 210, that is, the router 210 has information on the number of user terminals 200 provided in the image forming apparatus network 300.

Hereinafter, the image forming apparatus 100 is described in detail.

Figure 2:
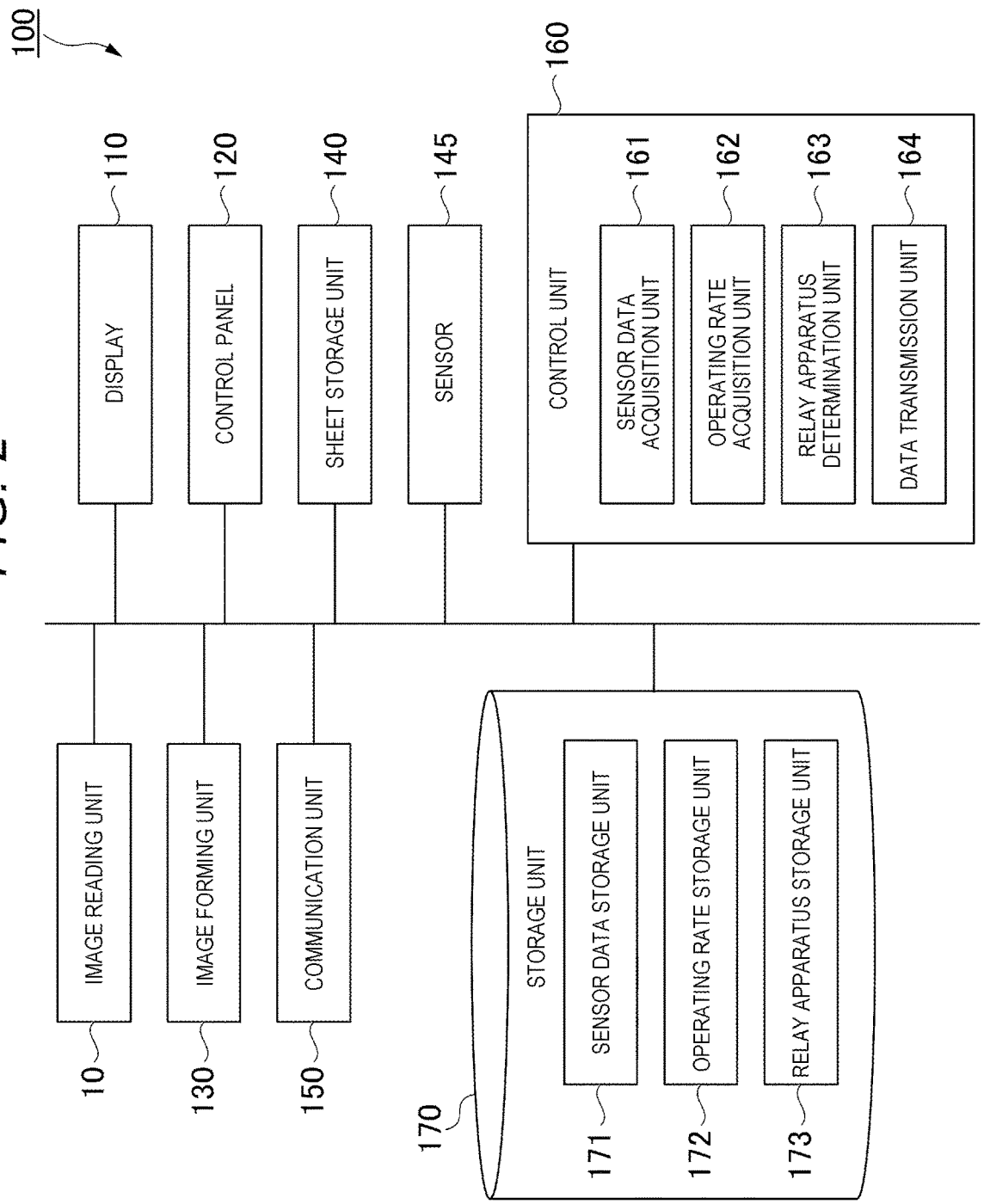
FIG. 2 is a hardware block diagram of an image forming apparatus of the image forming system of FIG. 1, according to some embodiments.

FIG. 2 is a hardware block diagram of the image forming apparatus 100 according to the embodiment. First, the image forming apparatus 100 will be described in detail with reference to FIGS. 1 and 2. The image forming apparatus 100 includes an image reading unit 10 (e.g., scanner), a display 110, a control panel 120 (e.g., user interface), an image forming unit 130 (e.g., a printer), a sheet storage unit 140 (e.g., paper tray, paper hopper system, etc.), a sensor 145 (e.g., a temperature sensor, a humidity sensor, an environmental sensor, a sensor array, etc.), a communication unit 150, a control unit 160, and a storage unit 170.

The image forming apparatus 100 forms an image on a sheet using a developer such as toner or ink. When the developer is toner, the developer is fixed on the sheet by being heated. When the developer is ink, the developer is dropped onto the sheet to form the image on the sheet. The sheet is, for example, paper or label paper. The sheet may be any material or print medium as long as the image forming apparatus 100 can form the image on a surface of the sheet. For example, the sheet may be a roll of paper, a sheet of paper, label paper, thermal tape, etc.

The image reading unit 10 reads image information to be read as brightness and darkness of light. For example, the image reading unit 10 may be a barcode scanner, a QR code scanner, etc. The image reading unit 10 records the read image information into the storage unit 170. The recorded image information may be transmitted to the user terminal 200 via the router 210. The recorded image information may be transmitted to the server 400 or another image forming apparatus 100. The recorded image information may be image-formed on the sheet by the image forming unit 130.

The display 110 is an image display device such as a liquid crystal display or an organic electro luminescence (EL) display. The display 110 displays various types of information on the image forming apparatus 100. The display 110 displays, to the user, a screen related to an operation. For example, the display 110 may display a screen prompting the user to operate or a screen showing options to the user (hereinafter collectively referred to as an "operation screen"). The display 110 may be implemented as a touch panel, and display a screen for receiving an operation (a specific example of the operation screen).

The control panel 120 includes an operation device including a plurality of buttons or the like. The control panel 120 receives an operation from the user. For example, the control panel 120 may receive input of numerals or letters. For example, the control panel 120 may receive an operation of selecting one or more jobs (e.g., print jobs) from candidates displayed on the display 110. The control panel 120 outputs, to the control unit 160, a signal corresponding to an operation performed by the user. The display 110 and the control panel 120 may be implemented as an integrated touch panel.

The image forming unit 130 forms the image on the sheet based on image information generated by the image reading unit 10 or image information received via the network 500. The image forming unit 130 includes, for example, a photosensitive drum, an exposure device, a developing device, a transfer device, and a fixing device. A sheet conveying path is formed in the image forming unit 130. The sheet to be processed is conveyed by rollers provided in the conveying path. The image is formed on the sheet during conveyance.

The image forming unit 130 forms the image by, for example, the following processing. The exposure device of the image forming unit 130 forms an electrostatic latent image on a photosensitive drum based on the image information. The developing device of the image forming unit 130 forms a visible image by attaching the developer to the electrostatic latent image.

The transfer device of the image forming unit 130 transfers the visible image onto the sheet. The fixing device of the image forming unit 130 fixes the visible image on the sheet by applying heat and pressure to the sheet. The sheet on which the image is to be formed may be a sheet stored and conveyed in the sheet storage unit 140, or may be a manually fed sheet.

The sheet storage unit 140 stores sheets used for image formation in the image forming unit 130, and conveys the sheets to the image forming unit 130 by a conveying roller.

The sensor 145 senses surroundings of the image forming apparatus 100 and acquires data on the surroundings. The sensor 145 is, for example, a temperature sensor, and acquires a temperature around the image forming apparatus 100. The sensor 145 is, for example, a humidity sensor, and acquires a humidity around the image forming apparatus 100.

The communication unit 150 is implemented using a communication interface. The communication unit 150 communicates with the user terminal 200 via the router 210. The communication unit 150 communicates with the server 400 and another image forming apparatus 100. The communication unit 150 acquires data from the sensor 145 and outputs the data to the control unit 160. The communication unit 150 communicates with the router 210.

The control unit 160 (e.g., controller, microcontroller, processing circuit, etc.) includes a memory and a processor such as a central processing unit (CPU). The control unit 160 controls acts of devices provided in the image forming apparatus 100. The control unit 160 functions as, for example, a sensor data acquisition unit 161, an operating rate acquisition unit 162, a relay apparatus determination unit 163, and a data transmission unit 164.

The sensor data acquisition unit 161 acquires data from the sensor 145. The sensor data acquisition unit 161 may acquire the data from the sensor 145 via the communication unit 150. The sensor data acquisition unit 161 records the acquired sensor data into a sensor data storage unit 171 to be described later.

The operating rate acquisition unit 162 acquires an operating rate. The operating rate acquisition unit 162 acquires, for example, from the router 210, subnet information or SSID information connected to the router 210, thereby acquiring, as the operating rate, the number of user terminals 200 connected to the router 210. The subnet information or the information on the SSID is acquired from the router 210, for example, via the router 210 or by scraping a Web page provided by the router 210. The operating rate acquisition unit 162 records the acquired operating rate into an operating rate storage unit 172 to be described later.

The operating rate acquisition unit 162 acquires an operating rate of another image forming apparatus 100. The operating rate acquisition unit 162 acquires the operating rate of the other image forming apparatus 100 from the operating rate storage unit 172 of the corresponding image forming apparatus 100, for example. The operating rate acquisition unit 162 may acquire an operating rate of another image forming apparatus 100 from the router 210 of another image forming apparatus network 300.

The relay apparatus determination unit 163 determines an apparatus via which the sensor data is transmitted. The relay apparatus determination unit 163 compares the numbers of terminals respectively acquired by the operating rate acquisition units 162 of the image forming apparatuses 100, and determines the image forming apparatus 100 having a relatively low operating rate as an apparatus via which the sensor data is transmitted during transmission of the sensor data. In the example illustrated in FIG. 1, three user terminals 200-1-1, 200-1-2, and 200-1-3 are connected to a router 210-1, and two user terminals 200-2-1 and 200-2-2 are connected to a router 210-2. Therefore, a relay apparatus determination unit 163-1 of an image forming apparatus network 300-1 determines the image forming apparatus 100-2 as an image forming apparatus having a relatively low operating rate, and determines the image forming apparatus 100-2 as the relay apparatus. The relay apparatus determination unit 163 may determine, as the relay apparatus, the image forming apparatus 100 having the lowest operating rate among three or more image forming apparatus networks 300, or may determine, as the relay apparatus, another image forming apparatus 100 having a lower operating rate than that of the own image forming apparatus 100.

The relay apparatus determination unit 163 records information on the determined relay apparatus into a relay apparatus storage unit 173.

The operating rate acquisition unit 162 acquires the operating rate at regular time intervals and updates the operating rate stored in the operating rate storage unit 172. The relay apparatus determination unit 163 determines the relay apparatus at regular time intervals, and updates information on the relay apparatus stored in the relay apparatus storage unit 173.

The data transmission unit 164 transmits the sensor data stored in the sensor data storage unit 171 to the server 400 via the image forming apparatus 100 stored as the relay apparatus in the relay apparatus storage unit 173. When the image forming apparatus 100 stored as the relay apparatus in the relay apparatus storage unit 173 is the own apparatus, the data transmission unit 164 may transmit the sensor data to the server 400 without passing through another image forming apparatus 100.

The storage unit 170 is implemented using a storage device such as a magnetic hard disk device or a semiconductor storage device. The storage unit 170 stores data required when the image forming apparatus 100 acts. The storage unit 170 includes the sensor data storage unit 171, the operating rate storage unit 172, and the relay apparatus storage unit 173.

The sensor data storage unit 171 stores the data acquired by the sensor 145. The operating rate storage unit 172 stores the operating rate acquired by the operating rate acquisition unit 162. The relay apparatus storage unit 173 stores data on the relay apparatus determined by the relay apparatus determination unit 163.

FIG. 3 is a schematic block diagram illustrating a specific example of a functional configuration of the user terminal 200. The user terminal 200 is implemented using an information device such as a smart phone, a tablet, a personal computer, a portable game machine, a stationary game machine, or a dedicated device. The user terminal 200 includes a communication unit 21, an operation unit 22, a display unit 23, a storage unit 24, and a control unit 25.

The communication unit 21 is a communication device. The communication unit 21 may be implemented as a network interface, for example. The communication unit 21 performs data communication with the image forming apparatus 100 and other user terminals 200 via the router 210 under control of the control unit 25. The communication unit 21 may be a device that performs wireless communication or a device that performs wired communication.

The operation unit 22 is implemented using an existing input device such as a keyboard, a pointing device (mouse, tablet, or the like), buttons, or a touch panel. The operation unit 22 is operated by the user when the user inputs an instruction to the user terminal 200. The operation unit 22 may be an interface that connects the input device to the user terminal 200. In this case, the operation unit 22 inputs, to the user terminal 200, an input signal generated according to input of the user in the input device. The operation unit 22 may be implemented in any manner as long as the user can input the instruction to the user terminal 200.

The display unit 23 is an image display device such as a liquid crystal display or an organic EL display. The display unit 23 displays, for example, image data of the operation screen received from the image forming apparatus 100. The display unit 23 may be an interface that connects the image display device to the user terminal 200. In this case, the display unit 23 generates a video signal for displaying the image data and outputs the video signal to the image display device connected to the display unit 23.

The storage unit 24 is implemented using a storage device such as a magnetic hard disk device or a semiconductor storage device. The storage unit 24 stores data used by the control unit 25.

The control unit 25 includes a memory and a processor such as a CPU. All or some of the functions of the control unit 25 may be implemented using hardware such as an ASIC, a PLD, or an FPGA. The above program may be recorded on a computer-readable recording medium. The computer-readable recording medium is a portable medium such as a flexible disk, a magneto-optical disk, a ROM, a CD-ROM, or a semiconductor storage device (for example, an SSD), or a storage device such as a hard disk or a semiconductor storage device built into a computer system. The above program may be transmitted via a telecommunication line.

FIG. 4 is a sequence chart illustrating an example of acts of the image forming system 600. An operating rate acquisition unit 162-1 of the image forming apparatus 100-1 acquires an operating rate of the own apparatus (ACT 101). In addition, the operating rate acquisition unit 162-1 of the image forming apparatus 100-1 acquires an operating rate of another image forming apparatus (ACT 102). The relay apparatus determination unit 163-1 determines a relay apparatus based on the operating rates (ACT 103). In the example illustrated in FIG. 1, the three user terminals 200-1-1, 200-1-2, and 200-1-3 are connected to the router 210-1, and the two user terminals 200-2-1 and 200-2-2 are connected to the router 210-2. Therefore, the relay apparatus determination unit 163-1 determines the image forming apparatus 100-2 as an image forming apparatus having a relatively low operating rate and determines the image forming apparatus 100-2 as the relay apparatus. The relay apparatus determination unit 163-1 records information on the determined relay apparatus into a relay apparatus storage unit 173-1 (ACT 104).

The sensor 145-1 acquires sensor data (ACT 105). Thereafter, the data transmission unit 164 transmits the sensor data to the server 400 via the image forming apparatus 100-2, which is the relay apparatus, based on the information in the relay apparatus storage unit 173 (ACT 106).

In the image forming system 600 configured as described above, the image forming apparatus 100 (for example, the image forming apparatus 100-1) can transmit data to an external apparatus such as the server 400 via another image forming apparatus 100 (for example, the image forming apparatus 100-2) determined to have the relatively low operating rate. The data to be transmitted by the image forming apparatus 100-1 having a relatively high operating rate is transmitted to the external apparatus via the image forming apparatus 100-2 having the low operating rate, whereby a load can be leveled.

For example, the data transmission unit 164 may transmit a signal for controlling an external device via the relay apparatus. For example, when the image forming apparatus 100-1 is connected to an electronic device and can control the electronic device by transmitting a control signal to the electronic device, the image forming apparatus 100-1 may control the electronic device by transmitting the control signal to the electronic device via another image forming apparatus 100-2, which is the relay apparatus, based on the information in the relay apparatus storage unit 173.

While certain embodiments have been described, these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. An image forming apparatus comprising:
a communications circuit configured to communicate with a networked image forming apparatus via a network;
a printer configured to form an image on a sheet; and a controller comprising a processor and a memory, the controller configured to:

acquire sensor data from a sensor operatively coupled to the controller;

determine, via the network, a relay image forming apparatus by identifying an image forming apparatus of a plurality of image forming apparatuses having relatively fewer user terminals connected thereto than the other image forming apparatuses of the plurality of image forming apparatuses, the plurality of image forming apparatuses including the image forming apparatus and the networked image forming apparatus; and transmit, via the relay image forming apparatus, the sensor data to a predetermined recipient apparatus.

2. The image forming apparatus of claim 1, wherein the controller is configured to:

transmit, via the relay image forming apparatus, a control signal to an electronic device communicably connected to the relay image forming apparatus.

3. A method for communication in an image forming system, the method comprising:

determining, via a processing circuit of an image forming apparatus, a relay image forming apparatus by identifying, via the processing circuit, an image forming apparatus having fewer user terminals connected thereto than a plurality of image forming apparatuses; and transmitting, via the relay image forming apparatus, sensor data to a predetermined recipient apparatus, the sensor data acquired from a sensor associated with the image forming apparatus.

4. The method of claim 3, further comprising:

transmitting, via the relay image forming apparatus, a control signal to an electronic device communicably connected to the relay image forming apparatus.

5. An image forming apparatus comprising:

a communications circuit configured to communicate with a plurality of image forming apparatuses via a network;

a printer configured to form an image on a sheet; and a sensor;

a controller comprising a processor and a memory, the controller configured to:

receive sensor data from the sensor;

select, as a relay image forming apparatus, an image forming apparatus from the plurality of image forming apparatuses based on identifying an image forming apparatus having relatively fewer user terminals connected thereto than at least one image forming apparatus of the plurality of image forming apparatuses; and transmit, via the relay image forming apparatus via the network, the sensor data to a predetermined recipient apparatus.

6. The image forming apparatus of claim 5, wherein the controller is configured to:

transmit, via the relay image forming apparatus, a control signal to an electronic device connected to the relay image forming apparatus to thereby control the electronic device.

7. The image forming apparatus of claim 5, wherein the sensor data includes at least one of a temperature or a humidity.

8. The image forming apparatus of claim 5, wherein the controller selects the relay image forming apparatus by identifying the image forming apparatus of the plurality of image forming apparatuses having a fewest number of user terminals connected thereto among the plurality of image forming apparatuses.

9. The image forming apparatus of claim 5, further comprising a user interface configured to receive a user input regarding a print job.

10. The image forming apparatus of claim 5, further comprising a scanner configured to read encoded image information from images; and wherein the controller is configured to command the printer to form an image based on the encoded image information.

11. The image forming apparatus of claim 5, wherein the controller is configured to acquire time varying values of a quantity of user terminals connected to each of the plurality of image forming apparatuses.

12. The image forming apparatus of claim 5, wherein the predetermined recipient apparatus is a server.

13. The image forming apparatus of claim 12, wherein the predetermined recipient apparatus is connected to the communications circuit via a router of the network.

14. An image forming apparatus comprising:

a communications circuit configured to communicate with a plurality of image forming apparatuses via a network;

a printer configured to form an image on a sheet; and a sensor;

a controller comprising a processor and a memory, the controller configured to:

receive sensor data from the sensor;

select, as a relay image forming apparatus, a first image forming apparatus from the plurality of image forming apparatuses, the first image forming apparatus having an operating rate that is lower than an operating rate of at least one image forming apparatus of the plurality of image forming apparatuses; and transmit, via the relay image forming apparatus via the network, the sensor data to a predetermined recipient apparatus, wherein the network includes a first router and a second router, the first router in communication with the communications circuit and a first plurality of user terminals, the second router is in communication with a second plurality of user terminals and a second image forming apparatus of the plurality of image forming apparatuses.

15. The image forming apparatus of claim 14, wherein the first plurality of user terminals is larger than the second plurality of user terminals.

16. The image forming apparatus of claim 14, wherein the controller is configured to select the relay image forming apparatus based on a comparison between the first plurality of user terminals and the second plurality of user terminals.

* * * * *